Aug. 8, 1950     A. M. DRAKE     2,518,226
BALANCED WHEEL MOUNTING
Filed Oct. 1, 1948
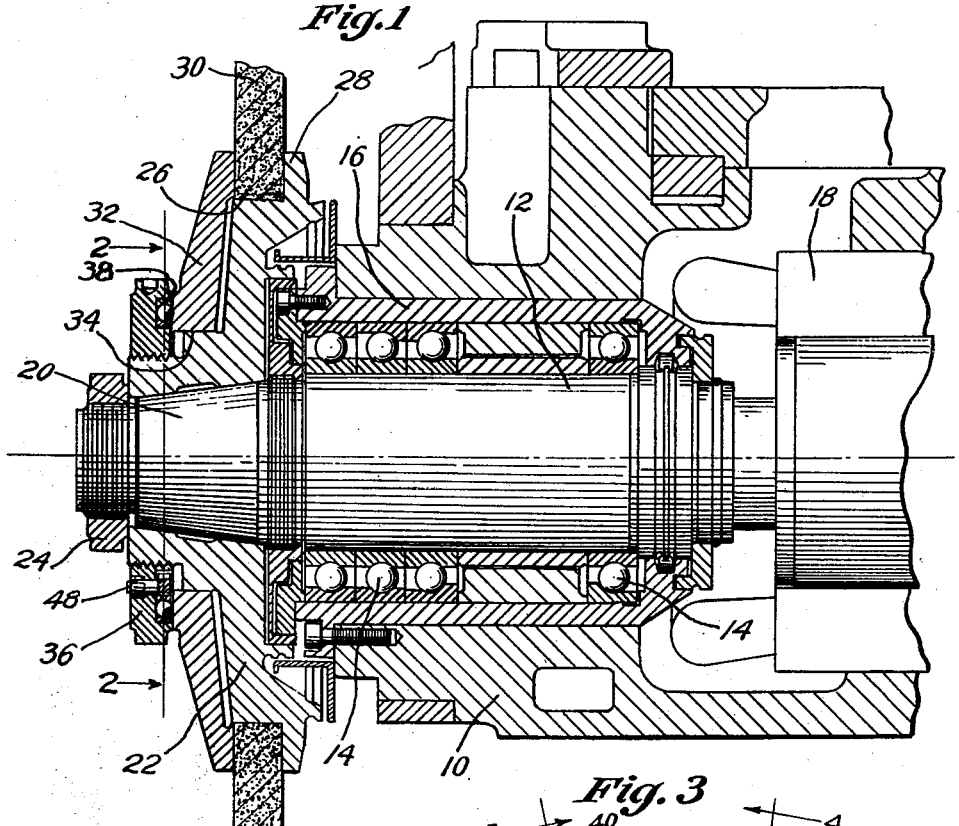
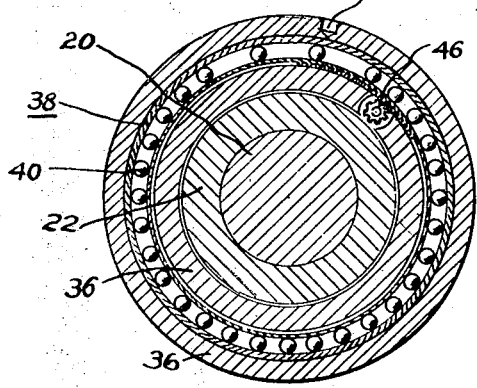
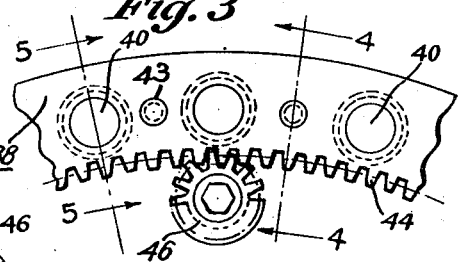
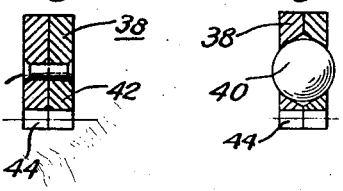
INVENTOR
*Alden M. Drake*
BY
*Joseph K. Schofield*
ATTORNEY Patented Aug. 8, 1950

2,518,226

UNITED STATES PATENT OFFICE 2,518,226

BALANCED WHEEL MOUNTING

Alden M. Drake, West Hartford, Conn., assignor to Niles-Bement-Pond Company, West Hartford, Conn., a corporation of New Jersey Application October 1, 1948, Serial No. 52,317

5 Claims. (Cl. 51—169)

This invention relates to grinding machines and particularly to a device for mounting an abrasive wheel on a rotatable spindle in a manner to facilitate tightening the wheel in position and permit balancing the assembled spindle head and wheel.

An object of the invention is to provide an improved wheel spindle having a head for attachment of the wheel, the wheel mounting member having an integral flange formed thereon and a removable flange engaging the opposite face of the wheel for clamping the wheel in position.

A feature of importance of the invention is that the removable flange may be manually tightened by an easily rotatable nut, the bearing between the nut and the removable flange comprising an anti-friction bearing to substantially reduce the friction.

Another feature of the invention is that the anti-friction bearing may have irregularly spaced anti-friction members to vary the balancing effect of the bearing and thus make possible balancing the assembled spindle head and wheel.

Another object of the invention is to provide means for manually adjusting the angular position of the anti-friction bearing with the wheel mounted in position on its spindle to dynamically balance the wheel end of the spindle and members mounted thereon.

With the above and other objects in view, the invention may include the features of construction and operation set forth in the following specification and illustrated in the accompanying drawings.

In the accompanying drawing annexed hereto and forming a part of this specification, I have shown the invention embodied in a standard form of wheel head for grinding machines but it will be understood that the invention may be otherwise embodied and that the drawing is not to be construed as defining or limiting the scope of the invention, the claims appended to this specification being relied upon for that purpose.

In the drawing:

Figure 1 is a longitudinal central section of the wheel head showing the wheel spindle and mounting.

Figure 2 is a cross sectional view taken on the plane of line 2—2 in Figure 1.

Figure 3 is a detail view on an enlarged scale of a portion of the anti-friction bearing within the nut for clamping the wheel in position, and its rotating member for varying its balance.

Figure 4 is a transverse section of the anti-friction bearing taken upon the plane of line 4—4 in Figure 3, and Figure 5 is a similar sectional view taken upon the plane of line 5—5 in Figure 3.

In the above-referred to drawing there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: First, a spindle rotatably mounted within a wheel head, preferably having its driving motor directly mounted thereon; second, a wheel mounting member secured on one end of the spindle and having a cylindrical bearing surface for a wheel and an integral flange at its periphery; third, an abrasive wheel mounted on its mounting member and having one surface in engagement with the integral flange; fourth, a removable flange mounted on the wheel mounting member and engaging the opposite face of the grinding wheel; fifth, a nut threaded on the wheel mounting member and having one face contacting the removable flange; sixth, a ball bearing mounted concentrically within the nut and having its anti-friction members in contact with adjacent side or radial surfaces of the nut and removable flange; and seventh, means to rotate the anti-friction bearing angularly relative to the nut within which it is mounted.

Referring more in detail to the figures of the drawing, there is shown in Figure 1 a longitudinal central sectional view of a wheel head 10 having a wheel spindle 12 rotatably mounted therein. Preferably, and as shown, this spindle 12 is mounted upon several spaced anti-friction bearings 14 housed within a sleeve 16 secured in position in an opening provided therefor in the head 10. The spindle 12 may also have directly mounted thereon its driving motor 18 and at its free end is provided with a conical surface 20 engaged by a wheel mounting member 22 secured fixedly in position thereon by a nut 24 threaded upon the outer end of the spindle 12.

The wheel mounting member 22 as shown, has a cylindrical surface 26 concentric with the axis of rotation of the spindle and a radially extending integral flange 28 adjacent thereto. On this cylindrical surface 26 and bearing against a face of the flange 28 is the abrasive wheel 30 which may be of any desired type required for the particular work being ground. Bearing against the opposite face of the wheel 30 is a removable flange or collar 32 slidably engaging a concentric cylindrical surface 34 also provided on the wheel mounting member 22.

To tighten the removable flange or collar 32 to clamp the wheel 30 between the collar 32 and integral flange 28 on the wheel mounting member 22, a nut 36 is provided threaded upon the outer end of the wheel mounting member 22.

The construction so far described is usual or conventional for grinding machines of various types and it is to facilitate the tightening of the nut 36 to clamp the wheel 30 and to provide a balancing means for the assembled spindle wheel mounting member 22 and attached parts that the following means are provided.

Housed within the face of the nut 36 adjacent to the removable flange 32 is an anti-friction bearing 38 such as a standard form of thrust ball bearing, the balls or other anti-friction members of which contact a radial surface on the nut 36 and bear against a corresponding radial surface of the removable flange 32. By tightening the nut 36 against the flange 32 with this anti-friction bearing interposed, the friction will be substantially reduced and tightening of the wheel 30 in position will be greatly facilitated.

As shown in Figure 2, the spacing of the anti-friction members 40 within the bearing 38 is irregular, several alternate ones being omitted from the upper part of the bearing as shown in Figure 2. This omission of several balls in one portion of the bearing is to vary the balancing effect of the assembled parts and more or less of the anti-friction members 40 may be removed for that purpose. To vary the relative angular position of the unbalanced portion of the anti-friction bearing 38 and the nut 36 to the wheel mounting member 22 and wheel 30, rings 42 of the anti-friction bearing 38 have gear teeth 44 cut upon their inner periphery, which gear teeth are engaged by a small pinion 46 housed within the nut 36. To secure the rings 42 together to retain the balls 40 in position, rivets or other securing means 43 may be provided. To rotate the pinion 46 and thus vary the relative angular position of the anti-friction bearing 38, the pinion 46 has a short shaft 48 extending forwardly through the nut 36 and having a non-circular end portion which may be engaged by a suitable socket wrench to rotate the pinion 46 and thus adjust the angular position of the bearing 38. To effect angular adjustment of the bearing 38, it is first necessary to slightly back off the nut 36 and after adjusting the bearing 38, the nut 36 may again be tightened. To rotate the nut 36, a recess 49 may be provided for the insertion of a spanner wrench. With the nut 36 slightly loosened, the anti-friction bearing 38 can be rotated to any angular position to vary the balancing of the wheel mounting 22 and to correct any unbalance of these rotating parts.

What I claim is:

1. A wheel mounting for a grinding machine comprising a rotatably mounted wheel spindle, a wheel mounting member on said spindle having an integral flange, a wheel on said member having a side surface disposed against a surface of said flange, a flange removably mounted on said member and engaging the opposite face of said wheel, a nut on said member for retaining said removable flange in position against said wheel, and an anti-friction bearing housed within said nut and having its anti-friction members contacting adjacent surfaces of said nut and removable flange.

2. A wheel mounting for a grinding machine comprising a rotatably mounted wheel spindle, a wheel mounting member on said spindle having an integral flange, a wheel on said member having a side surface disposed against a surface of said flange, a flange removably mounted on said member and engaging the opposite face of said wheel, a nut on said member for retaining said removable flange in position against said wheel, and an unbalanced anti-friction bearing disposed within said nut and having its anti-friction members contacting adjacent surfaces of said nut and removable flange.

3. A wheel mounting for a grinding machine comprising a rotatably mounted wheel spindle, a wheel mounting member on said spindle having an integral flange, a wheel on said member having a side surface disposed against a surface of said flange, a flange removably mounted on said member and engaging the opposite face of said wheel, a nut on said member for retaining said removable flange in position against said wheel, and an anti-friction bearing disposed within said nut and having unevenly spaced anti-friction members contacting adjacent surfaces of said nut and removable flange.

4. A wheel mounting for a grinding machine comprising a rotatably mounted wheel spindle, a wheel mounting member on said spindle having an integral flange, a wheel on said member having a side surface disposed against a surface of said flange, a flange removably mounted on said member and engaging the opposite face of said wheel, a nut on said member for retaining said removable flange in position against said wheel, an anti-friction thrust bearing disposed within said nut and having anti-friction members contacting adjacent surfaces of said nut and flange, and means to adjust the rotating position of said bearing relative to the nut.

5. A wheel mounting for a grinding machine comprising a rotatably mounted wheel spindle, a wheel mounting member on said spindle having an integral flange, a wheel on said member having a side surface disposed against a surface of said flange, a flange removably mounted on said member and engaging the opposite face of said wheel, a nut on said member for retaining said removable flange in position against said wheel, an anti-friction bearing disposed between and having its anti-friction members contacting the adjacent surfaces of said nut and flange, gear teeth formed on said bearing, a pinion within said nut having its teeth engaging the teeth on said bearing, and manual means to rotate said pinion.

ALDEN M. DRAKE.

REFERENCES CITED

The following references are of record in the file of this patent:

UNITED STATES PATENTS

| Number | Name | Date |
| --- | --- | --- |
| 2,071,200 | Drake | Feb. 16, 1937 |